Patented Sept. 7, 1926.

1,599,006

UNITED STATES PATENT OFFICE.

LOUIS BURGESS, OF JERSEY CITY, NEW JERSEY, ASSIGNOR TO STANDARD DEVELOPMENT COMPANY, A CORPORATION OF DELAWARE.

FOAM FOR FIRE PREVENTION.

No Drawing.    Application filed November 21, 1924. Serial No. 751,399.

This invention relates to improvements in foams and processes of making them from materials containing sulfonic compounds. The invention is directed particularly to the production of foams such as are used for extinguishing fires and covering combustible materials that may be in danger from fire.

In United States Patent No. 1,441,728, granted to H. G. L. Kent, the use of a salt of a mineral oil sulfonic compound as a foaming agent is described and claimed. The present invention relates generally to the same subject matter but is distinguished by the provision of an improved form of sulfonic compound.

In accordance with the present invention, I prepare a foam-producing solution comprising a sulfonic compound, preferably a sodium sulfonate manufactured by the process set forth in a patent application Serial No. 751,377 filed of even date herewith by Louis Burgess and H. E. Buc. As described in that application, sludge sulfonic acids are aged to impart desirable properties thereto and are then neutralized with an alkali metal hydroxid or other suitable base. The aging process may comprise allowing a sulfonic sludge to stand at atmospheric temperature for several weeks or longer, or it may comprise briefer treatment at higher temperatures. The alkali metal salts of sulfonic acids prepared in this way have exceptionally desirable properties for foaming purposes.

It will be understood that the process of aging the sludge should be carried on to the extent of producing a foam having the desired improved character. It is impracticable to give precise directions for the optimum duration of the aging, as this will vary with the nature of the sludge being operated upon and the reacting conditions. Simple comparative tests will show when the aging has progressed sufficiently to give the best results. Aging beyond this point should be avoided, because further modification of the sulfonic compounds may make them not so well suited for the purpose in hand.

According to one embodiment of the invention, a solution is made up with a small percentage (about ½ to 1%) of aged sulfonic acids or their salts and the liquid is foamed when desired by mechanically mixing carbon dioxid or other gas with it in a suitable gas and liquid injector nozzle. Preferably, however, carbon dioxid is liberated in situ in the liquid. It is preferable to make up two solutions, each containing an ingredient which upon mixing will react with evolution of carbon dioxid. At least one of the solutions will contain an aged sulfonic compound as a foam-building ingredient. Such solution will ordinarily constitute the continuous phase of the foam.

As an example, one solution may contain an acid, aluminum sulfate, or other suitable material, capable of reacting with carbonates or bicarbonates to produce carbon dioxid. The other solution may contain a carbonate or bicarbonate and a sodium sulfonate prepared from an aged sulfonic acid. When such solutions are mixed together a very voluminous and persistent foam results.

If desired, other body-forming materials, such as glue, may be incorporated in the solution.

The following is an example further illustrating the present invention: Two solutions are prepared, one containing about 13% by weight of aluminum sulfate and 87% of water and the other containing 8 to 10% of sodium bicarbonate, ½% of the improved sodium sulfonate, prepared from an aged mineral sludge sulfonic acid, and the remainder water. These solutions are separately stored and when required for use are brought together in substantially equal proportions by volume. Carbon dioxid is liberated and a tenacious foam is produced.

In some cases it may be preferable to use the solutions in unequal volumes. In this event the constituents to be dissolved are made up with relative proportions of the solvent accordingly. Thus in small fire extinguishers the container is sometimes built for a relative proportion of aluminum sulfate solution to carbonate solution of 1:4.75. In such case the concentration of aluminum sulfate and the other reagents in the solutions is correspondingly proportioned. The foregoing examples are merely illustrative and various modifications and alternative procedures may be adopted within the scope of the appended claims.

I claim:

1. A foam having as its continuous phase a liquid containing an aged mineral oil sulfonic compound.

2. A solution adapted for use in producing a foam and comprising a gas-forming reagent and an aged mineral oil sulfonic compound.

3. A solution adapted for use in producing a foam and comprising a gas-forming reagent and a sulfonate derived from an aged sulfonic acid.

4. In a process of forming a foam, introducing a gas into a solution containing an aged mineral oil sludge sulfonic compound.

5. In a process of forming a foam, bringing together a solution containing an aluminum salt and a solution of a salt of carbonic acid, at least one of said solutions containing also a sulfonate prepared from an aged sulfonic acid.

6. In a process of forming a foam, bringing together an aqueous solution containing aluminum sulfate, and an aqueous solution containing sodium bicarbonate and about ½% of a mineral oil sludge sulfonate prepared from an aged sulfonic acid.

LOUIS BURGESS.